(12) United States Patent
Herbers

(10) Patent No.: US 12,229,621 B2
(45) Date of Patent: Feb. 18, 2025

(54) CONTACTLESS BALE DISCHARGE AND POSITION MONITORING

(71) Applicant: AGCO Corporation, Duluth, GA (US)

(72) Inventor: Eric John Herbers, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 17/656,955

(22) Filed: Mar. 29, 2022

(65) Prior Publication Data
US 2022/0309262 A1 Sep. 29, 2022

Related U.S. Application Data

(60) Provisional application No. 63/167,450, filed on Mar. 29, 2021.

(51) Int. Cl.
*G06K 7/10* (2006.01)
*G06K 19/07* (2006.01)

(52) U.S. Cl.
CPC ..... *G06K 7/10366* (2013.01); *G06K 19/0723* (2013.01)

(58) Field of Classification Search
CPC ............. G06K 7/10366; G06K 19/0723
USPC ........................................... 235/451
See application file for complete search history.

(56) References Cited

U.S. PATENT DOCUMENTS

| 11,205,337 | B1 * | 12/2021 | Derscheid | A01F 15/08 |
| 2007/0175341 | A1 * | 8/2007 | Roberts | A01F 15/0816 |
| | | | | 100/102 |
| 2017/0287303 | A1 * | 10/2017 | Lang | G08B 21/0275 |
| 2018/0014467 | A1 * | 1/2018 | Lang | G09F 3/206 |
| 2021/0099861 | A1 * | 4/2021 | Surles | G06F 9/44505 |
| 2022/0124984 | A1 * | 4/2022 | Derscheid | A01F 15/0715 |

* cited by examiner

*Primary Examiner* — Michael G Lee
*Assistant Examiner* — David Tardif

(57) ABSTRACT

Technologies for monitoring discharged bales or bale position on a baler can be improved by applying processes for identifying radio-frequency identification (RFID) tag location. A bale can include an RFID tag and a baler can include an RFID reader. The RFID reader can interrogate the RFID tag and a computing device of or connected to the RFID reader can identify the location of the RFID tag based on the interrogation. The computing device can determine a position of the bale on the baler based on the identified location of the RFID tag since spatial information of the bale and the baler is known. Also, the computing device can estimate a geographic location of the bale, after it has been discharged from the baler, based on an identified location of the RFID tag and an identified geographic location of the baler during the discharge of the bale.

20 Claims, 11 Drawing Sheets

600

Interrogating, by a RFID reader of a baler, an RFID tag of a bale
602

Identifying, by a computing device of or connected to the RFID reader, a relative location of the RFID tag with respect to the RFID reader based on the interrogation
604

Determining, by the computing device, a position of the bale based on the identified relative location of the RFID tag and spatial attributes of the baler and the bale
606

Controlling, by the computing device, an operation of the baler based on the determined position of the bale
608

```
Interrogating, by a RFID reader, an RFID tag of a bale during or
immediately after a discharge of the bale
702
```
↓
```
Identifying, by a computing device of or connected to the RFID reader, a
relative location of the RFID tag with respect to the RFID reader based on
the interrogation
704
```
↓
```
Identifying, by the computing device, a geographic location of the baler
during or immediately after the discharge of the bale
706
```
↓
```
estimating, by the computing device, a geographic location of the
discharged bale based on the identified relative location of the RFID tag
and the identified geographic location of the baler
708
```
↓
```
controlling, by the computing device, an operation of the baler based on
the estimated geographic location of the discharged bale
710
```

| | COLUMN 1 | COLUMN 2 | COLUMN 3 | COLUMN 4 |
|---|---|---|---|---|
| ROW 4 | | | | |
| ROW 3 | 906<br>*BALE ID 111540* | 908 | | |
| ROW 2 | *BALE ID 111550* | *BALE ID 111551* | *BALE ID 111541* | *BALE ID 111542* |
| ROW 1 | *BALE ID 111552* | *BALE ID 111560* | *BALE ID 111561* | *BALE ID 111562* |

FIG. 9

CONTACTLESS BALE DISCHARGE AND POSITION MONITORING

CROSS-REFERENCE TO RELATED APPLICATION

This application claims the benefit of the filing date of U.S. Provisional Patent Application 63/167,450, "Contactless Bale Discharge and Position Monitoring," filed Mar. 29, 2021, the entire disclosure of which is incorporated herein by reference.

TECHNICAL FIELD

The present disclosure relates to contactless bale discharge and position monitoring as well as enhancements thereof.

BACKGROUND

An agricultural baler collects crop material, such as hay, and compresses and arranges the crop material into a bale for easy transport and storage. Often grass in a hay field is cut and raked into windrows and allowed to dry. Afterwards, a baler collects the crop from the windrows to be compressed and arranged into bales. The baler can be pulled by a tractor or another type of tow vehicle or self-propelled. A baler gathers the crop material, moves the gathered material it to an internal baling chamber, and compresses and arranges the material into a bale. Typically, a bale is round or square. A round bale is a cylindrically shaped bale and often produced by a round baler. A square bale is a cube shaped bale and often produced by a square baler.

Some common round balers include a spinning pickup header that engages cut crop material in a windrow and directs it to rotors, augers, and other components of a feed mechanism that in turn moves the material to a baling chamber. The baling chamber can include a series of compression belts that receive the material. The belts in some example bailers move outward into the moving material so that a portion of a belt presses on an outer surface of a forming bale. The bale increases in size as more crop material is fed into the baling chamber until forming of the bale is complete. Once the bale is formed, a wrapping system wraps the bale with a bale wrap that can include a plastic sheet, net, or other type of bale wrap. A rear tailgate of a baler ejects the bale, and the process repeats itself for the next bale. A different process can be used to create a square bale. With producing square bales, a square baler operates by pre-forming a charge of material and then compressing it into a bale used a reciprocating plunger assembly. Also, a different process can be used to create a round bale. For example, a fix chamber round baler can be used and such a baler uses rollers or a combination of rollers and chains or slats.

Discharged bales or bale position on a baler or on an accumulator can be monitored for various reasons. Known bale discharge and position monitoring systems typically require mechanical operations or sensing of mechanical operations that come into contact with a bale. Such mechanical operations can require undesired maintenance and can be cost prohibitive. However, such issues can be limited or removed completely by having contactless monitoring. This can include monitoring without a certain mechanical operation or apparatus required to contact a bale being discharged or positioned. Unfortunately, contactless bale monitoring methods are not well known nor commonly adopted. Also, for example, if an accumulator includes a scale that only weighs a subset of bales carried, it is difficult for an operator to identify which bale was weighed by monitoring positions of a bale on an accumulator via known mechanical methods for monitoring bales.

SUMMARY

Described herein are improved systems and methods for contactless bale discharge and position monitoring. For example, described herein are improved systems and methods for contactless bale discharge and position monitoring using radio-frequency identification (RFID) technologies.

In improving contactless bale discharge and position monitoring, the systems and methods overcome some technical problems in farming of crops. The systems and methods (or techniques) disclosed herein can provide specific technical solutions to at least overcome the technical problems mentioned in the background section and other parts of the application as well as other technical problems not described herein but recognized by those skilled in the art.

The techniques disclosed herein can be used to improve monitoring discharged bales or bale position on a baler or an accumulator attached to a baler. Such techniques can provide the monitoring without a certain mechanical operation or apparatus required to contact a bale being discharged or positioned. For example, the techniques disclosed herein can monitor discharged bales or bale position by applying processes for identifying RFID tag location. Also, if an accumulator includes a scale that only weighs a subset of the bales carried, the system allows an operator to identify which bale was weighed by monitoring positions of a bale on an accumulator.

In some embodiments, a bale can include an RFID tag and a baler can include an RFID reader. The RFID reader can interrogate the RFID tag and a computing device of or connected to the RFID reader can identify the location of the RFID tag based on the interrogation. The computing device can determine a position of the bale on the baler based on the identified location of the RFID tag since spatial information of the bale and the baler is known. Also, in some embodiments, the computing device can estimate a geographic location of the bale, after it has been discharged from the baler, based on an identified location of the RFID tag and an identified geographic location of the baler during the discharge of the bale.

The aforesaid techniques as well as other technologies described herein can resolve the technical problems mentioned in the background section and other parts of the application as well as other technical problems not described herein but recognized by those skilled in the art.

With respect to some embodiments, disclosed herein are computerized methods for contactless bale discharge and position monitoring, such as contactless bale discharge and position monitoring using RFID technologies, as well as a non-transitory computer-readable storage medium for carrying out technical operations of the computerized methods. The non-transitory computer-readable storage medium has tangibly stored thereon, or tangibly encoded thereon, computer readable instructions that when executed by one or more devices (e.g., one or more personal computers or servers) cause at least one processor to perform a method for improved contactless bale discharge and position monitoring, such as improved contactless bale discharge and position monitoring using RFID technologies.

For example, in some embodiments, a method includes interrogating, by a radio-frequency identification (RFID)

reader of a baler, an RFID tag of a bale. The method can also include identifying, by a computing device of or connected to the RFID reader, a relative location of the RFID tag with respect to the RFID reader based on the interrogation. Also, the method can include determining, by the computing device, a position of the bale based on the identified relative location of the RFID tag. The method can also include controlling, by the computing device, an operation of the baler based on the determined position of the bale.

In some embodiments, the identified relative location of the RFID tag is an identified first relative location of the RFID tag, the RFID reader is a first RFID reader, and the method can include interrogating, by a second RFID reader, the RFID tag. The method can also include identifying, by the computing device, a second relative location of the RFID tag based on the interrogation by the second RFID reader. Also, the method can include determining, by the computing device, the position of the bale based on the identified first relative location of the RFID tag, the identified second relative location of the RFID tag, and the spatial attributes of the baler and the bale.

In some embodiments, the identified relative location of the RFID tag is a first identified relative location of the RFID tag, the RFID tag is a first RFID tag of the bale, and the method can include interrogating, by the RFID reader, a second RFID tag of the bale. Also, the method can include identifying, by the computing device, a second relative location of the second RFID tag based on the interrogation of the second RFID tag. The method can also include determining, by the computing device, the position of the bale based on the identified first relative location of the first RFID tag, the identified second relative location of the second RFID tag, and the spatial attributes of the baler and the bale.

In some embodiments, the relative location of the RFID tag is a first relative location of the RFID tag, the RFID reader is a first RFID reader, and the method can include interrogating, by a second RFID reader of the baler, the RFID tag during discharge of the bale. Also, the method can include identifying, by the computing device, a second relative location of the RFID tag based on the interrogation of the RFID tag by the second RFID reader. The method cam also include identifying, by the computing device, a geographic location of the baler during the discharge of the bale as well as estimating, by the computing device, the geographic location of the discharged bale based on the identified second relative location of the RFID tag and the identified geographic location of the baler. The identification of the geographic location of the baler can occur via a global position system (GPS).

In some embodiments, the method can include discharging the bale by the baler. The method can also include detecting the discharge of the bale via the RFID reader or a second RFID reader. Also, the method can include controlling, by the computing device, an operation of the baler based on the detected discharge of the bale.

In some embodiments, the interrogation of the RFID tag can include transmitting, by an antenna of the RFID reader, an electromagnetic interrogation pulse to the RFID tag. The interrogation can also include receiving, at the antenna of the RFID reader, a response signal from the RFID tag. The response signal can be transmitted from the RFID tag in response to the electromagnetic interrogation pulse powering the RFID tag. In such embodiments and others, the identifying of the relative location of the RFID tag can include determining a physical attribute of the received response signal as well as identifying the relative location of the RFID tag based on the determined physical attribute of the received response signal. The determined physical attribute of the received response signal can include a phase angle difference of the received response signal, a received signal strength indicator (RSSI) of the received response signal, another type of attribute of the received response signal, or a combination thereof.

Also, for example, in some embodiments, a method includes the following steps: (a) interrogating, by a radio-frequency identification (RFID) reader of a baler, an RFID tag of a bale before discharge of the bale; (b) identifying, by a computing device of or connected to the RFID reader, a relative location of the RFID tag with respect to the RFID reader based on the interrogation; (c) determining, by the computing device, a position of the bale on the baler based on the identified relative location of the RFID tag and spatial attributes of the baler and the bale; (d) repeating steps (a) through (c) for multiple bales; and (e) generating, by the computing device, a map of determined positions of each bale on the baler for the multiple bales.

With respect to some embodiments, a system is provided that includes at least one computing device configured to provide improved ways for contactless bale discharge and position monitoring, such as contactless bale discharge and position monitoring using RFID technologies. And, with respect to some embodiments, a method, such as one of the aforesaid methods, is provided to be performed by at least one computing device. In some example embodiments, computer program code can be executed by at least one processor of one or more computing devices to implement functionality in accordance with at least some embodiments described herein; and the computer program code being at least a part of or stored in a non-transitory computer-readable medium.

For example, in some embodiments, a system includes a radio-frequency identification (RFID) reader of a baler, configured to interrogate an RFID tag of a bale before a discharge of the bale. The system also includes a computing device of or connected to the RFID reader, configured to: identify a relative location of the RFID tag with respect to the RFID reader based on the interrogation; and determine a position of the bale on the baler or an accumulator of or attached to the baler based on the identified relative location of the RFID tag and spatial attributes of at least one of the baler, the accumulator, the bale, or any combination thereof. Also, the computing device can be configured to control an operation of the baler based on the determined position of the bale.

In some embodiments of the system, in the interrogation of the RFID tag, an antenna of the RFID reader is configured to: transmit an electromagnetic interrogation pulse to the RFID tag; and receive a response signal from the RFID tag, wherein the response signal is transmitted from the RFID tag in response to the electromagnetic interrogation pulse powering the RFID tag. Also, in the identifying of the relative location of the RFID tag, the computing device can be configured to: determine a physical attribute of the received response signal; and identify the relative location of the RFID tag based on the determined physical attribute of the received response signal. The determined physical attribute of the received response signal can include a phase angle difference of the received response signal, a RSSI of the received response signal, another type of attribute of the received response signal, or a combination thereof.

In some embodiments of the system, the relative location of the RFID tag is a first relative location of the RFID tag, and the system includes the baler. The baler is configured to discharge the bale and the RFID reader is configured to interrogate the RFID tag during the discharge of the bale. Also, the computing device is configured to: identify a second relative location of the RFID tag based on the interrogation during the discharge of the bale; identify a geographic location of the baler during the discharge of the bale; and estimate a geographic location of the discharged bale based on the identified second relative location of the RFID tag and the identified geographic location of the baler. Also, the computing device can be configured to control an operation of the baler based on the estimated geographic location of the discharged bale.

These and other important aspects of the invention are described more fully in the detailed description below. The invention is not limited to the particular methods and systems described herein. Other embodiments can be used and changes to the described embodiments can be made without departing from the scope of the claims that follow the detailed description.

BRIEF DESCRIPTION OF THE DRAWINGS

The present disclosure will be understood more fully from the detailed description given below and from the accompanying drawings of various embodiments of the disclosure.

FIGS. 6, 7, 8, and 10 illustrate example methods in accordance with some embodiments of the present disclosure.

FIG. 9 illustrates an example map of accumulated bales on an accumulator, such as an accumulator that is configured to attach to the baler shown in FIG. 3, in accordance with some embodiments of the present disclosure.

DETAILED DESCRIPTION OF EXAMPLE EMBODIMENTS

Details of example embodiments of the invention are described in the following detailed description with reference to the drawings. Although the detailed description provides reference to example embodiments, it is to be understood that the invention disclosed herein is not limited to such example embodiments. But to the contrary, the invention disclosed herein includes numerous alternatives, modifications and equivalents as will become apparent from consideration of the following detailed description and other parts of this disclosure.

Figure 1:
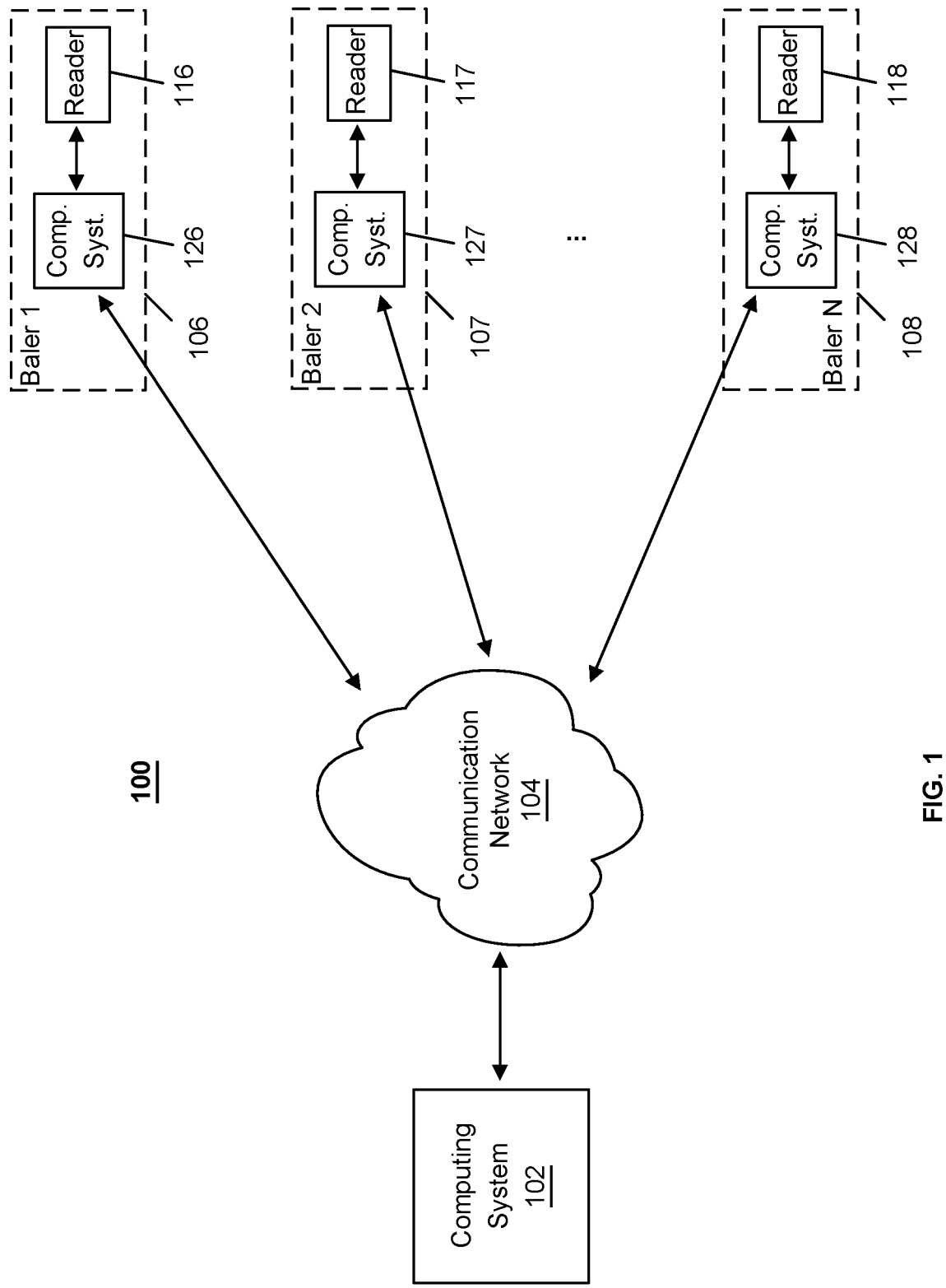
FIG. 1 illustrates an example network of balers (with or without accumulators) with each baler having a computing system and an RFID reader that communicate with an external computing system through a communication network, in accordance with some embodiments of the present disclosure.

FIG. 1 illustrates network 100 including at least one computing system (e.g., see computing system 102), a communication network 104, and balers (with or without accumulators), e.g., see balers 106, 107, and 108. As shown, a baler of the network 100 can include an RFID reader (e.g., see RFID readers 116, 117, and 118) and a computing system (e.g., see computing systems 126, 127, and 128). Also, a tractor or another type of towing vehicle attached to a baler of the network 100 can include a computing system similar to the computing system of a baler. Any computing system of the network 100 and any RFID reader of the network (e.g., see computing systems 126, 127, and 128 and RFID readers 116, 117, and 118) can be configured to communicate with an external computing system (e.g., see computing system 102) through a communication network (e.g., see communication network 104). Also, the computing systems of the balers of the network 100 can include a processor, memory, a communication interface and one or more sensors (such as one of the sensors including the RFID reader) that can make the balers individual computing devices. Also, a tractor or accumulator attached to one of the balers can be an individual computing device in the same way. In the case of the communication network 104 including the Internet, the balers 106, 107, and 108 can be considered Internet of Things (IoT) devices. Also, a tactor or accumulator attached to one of the balers can be considered an IoT device if it includes a computing system that connects to the Internet.

An RFID reader of the network 100 (e.g., see RFID readers 116, 117, and 118) can include circuitry that can receive electromagnetic fields and interpret received electromagnetic fields to automatically identify and track RFID tags attached to objects, such as a bale itself or binding material that wraps around a bale (e.g., mesh wrap, twine, plastic banding, etc.). When triggered by an electromagnetic interrogation pulse from a nearby RFID reader, the RFID tag transmits digital data, usually an identifying inventory number, back to the reader. This number can be used to track inventory goods such as an inventory of bales. In the electromagnetic signals that transport the digital data from the RFID tag to the RFID reader, included are electromagnetic signal attributes that are detectable and can be used, by a computing system, to approximate a location of the tag relative to the reader. The computing system that determines the approximate location of the RFID tag can be a part of or connected to the RFID reader.

Figure 4:
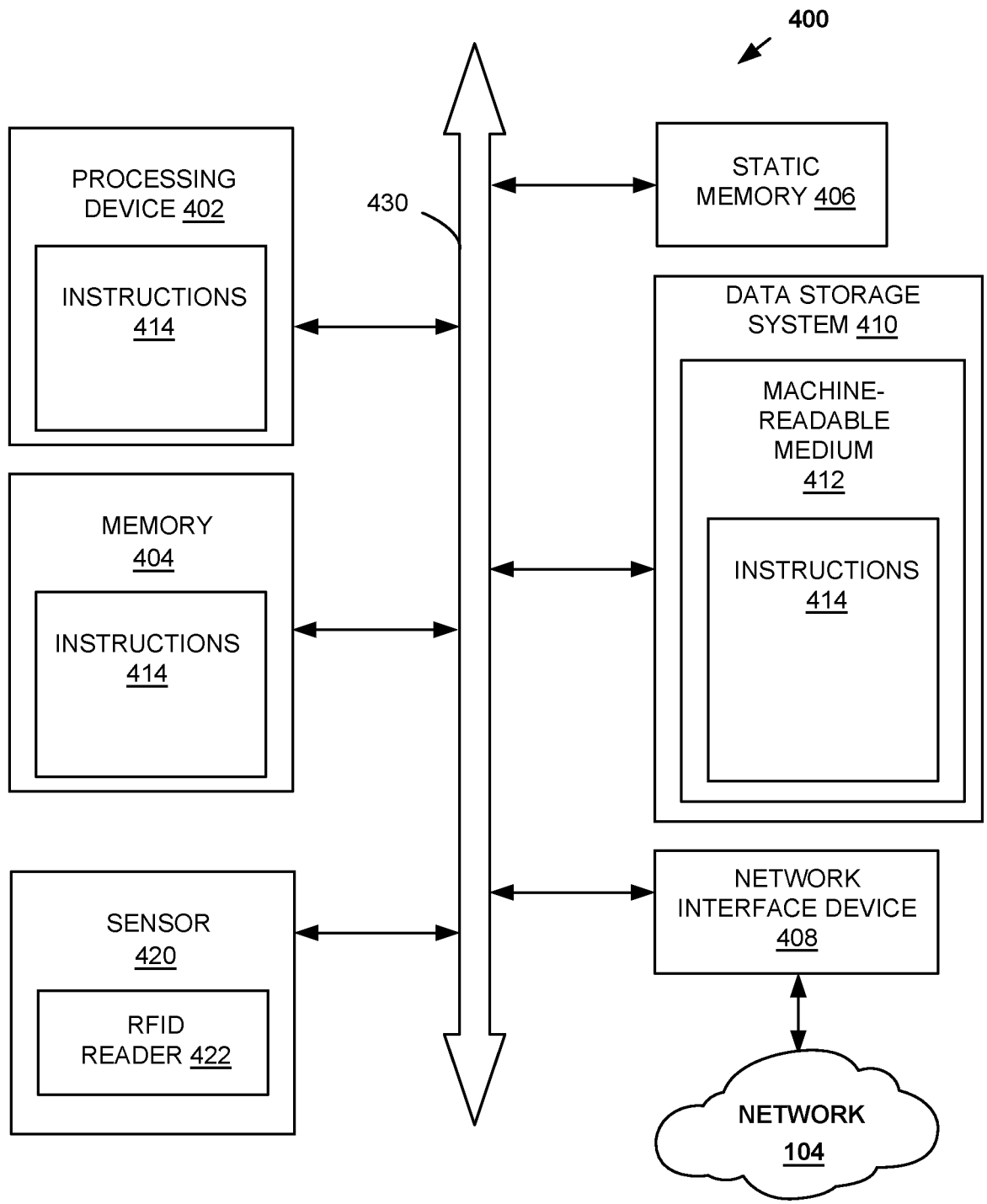
FIG. 4 illustrates a block diagram of example aspects of an example computing system that can be a part of a baler, an accumulator or a tractor, such as the baler or the tractor shown in FIG. 3, in accordance with some embodiments of the present disclosure.
Figure 5:
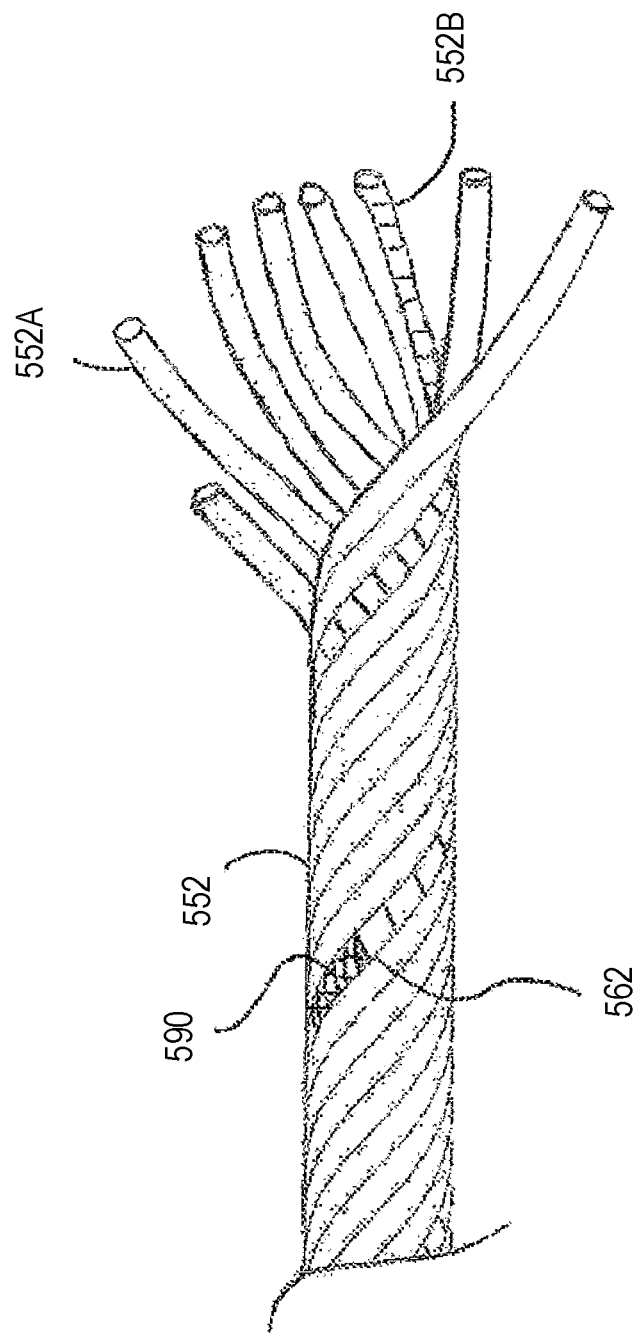
FIG. 5 illustrates side view of a binding material containing a bale identification tag, in accordance with some embodiments of the present disclosure.

In some embodiments, an RFID tag can be integrated into a baling twine used to bind hay, straw, or any other type of crop into bales (e.g., see the twine made up of binding material 552 shown in FIG. 5). The RFID reader (e.g., see RFID readers 116, 117, and 118) can be attached to the baler (e.g., see balers 106, 107, and 108) at any part of the baler, such as any part of a baler described herein (e.g., see example parts of a baler shown in FIG. 3). In some embodiments, the RFID reader can be attached to a vehicle that tows the baler or a bale accumulator that is connected to or attached to the baler (e.g., see example parts of the towing vehicle shown in FIG. 3). The RFID reader (e.g., see RFID readers 116, 117, and 118) can be configured to interrogate an RFID tag of a bale (such as a tag integrated into a bailing twine that is wrapped around the bale). The interrogation can occur before, during, or immediately after a discharge of the bale. A computing device of or connected to the RFID reader (e.g., see computing systems 102, 126, 127, and 128 shown in FIG. 1 or computing system 400 shown in FIG. 4) can be configured to identify a relative location of the RFID tag with respect to the RFID reader based on the interrogation and determine a position of the bale on the baler or on an accumulator of or attached to the baler based on the identified relative location of the RFID tag and spatial attributes of at least one of the baler, the accumulator, the bale, or any combination thereof. The computing device can also be configured to control an operation of the baler based on the determined position of the bale. In the interrogation of the RFID tag, an antenna of the RFID reader can be configured to transmit an electromagnetic interrogation pulse to the RFID tag and receive a response signal from the RFID tag. The response signal can be transmitted from the RFID tag in response to the electromagnetic interrogation pulse powering the RFID tag. In the identifying of the relative location of the RFID tag, the computing device can be configured to determine a physical attribute of the received response signal and identify the relative location of the RFID tag based on the determined physical attribute of the received response signal.

The determined physical attribute of the received response signal can include a phase angle difference (e.g., a phase angle rotation, phase differences of arrival (PDoA)) of the received response signal, a multifrequency phase difference (e.g., multifrequency carrier phase difference of arrival (MF-PDoA)) of the received response signal, a time of arrival (ToA) of the received response signal, signal time difference of arrival (TDoA) of the received response signal, a signal angle of arrival (AoA) of the received response signal, a RSSI of the received response signal, a signal-noise ratio (SNR) of the received response signal, a Doppler shift of the received response signal, or any other known type of attribute of a received electromagnetic signal, or any combination thereof. The computing system can determine the physical attribute of the received response signal, such as a phase angle difference, from a corresponding transmitted signal of the received response signal and one or more backscattered signals of the received response signal. With use of PDOA to determine location or position of RFID tags, different domains of PDoA can be used including time domain PDOA (TD-PDoA), frequency domain PDoA (FD-PDoA), and spatial domain PDOA (SD-PDoA).

In some embodiments, the relative location of the RFID tag is a first relative location of the RFID tag, the baler can be configured to discharge the bale, and the RFID reader can be configured to interrogate the RFID tag during the discharge of the bale or immediately after the discharge of the bale. In such embodiments, the computing device can be configured to identify a second relative location of the RFID tag based on the interrogation during or after the discharge of the bale. The computing device can also be configured to identify a geographic location of the baler during the discharge of the bale and estimate a geographic location of the discharged bale based on the identified second relative location of the RFID tag and the identified geographic location of the baler.

The communication network 104 can include one or more local area networks (LAN(s)) and/or one or more wide area networks (WAN(s)). The communication network 104 can include the Internet and/or any other type of interconnected communications network. The communication network 104 can also include a single computer network or a telecommunications network. More specifically, the communication network 104 can include a local area network (LAN) such as a private computer network that connects computers in small physical areas, a wide area network (WAN) to connect computers located in different geographical locations, and/or a middle area network (MAN) to connect computers in a geographic area larger than that covered by a large LAN but smaller than the area covered by a WAN.

As shown, at least each shown component of the network 100 (including computing system 102, communication network 104, and balers 106, 107, and 108) can be or include a computing system which can include memory that can include media. The media can include or be volatile memory components, non-volatile memory components, or a combination of thereof. In general, each of the computing systems can include a host system that uses memory. For example, the host system can write data to the memory and read data from the memory. The host system can be a computing device that includes a memory and a data processing device. The host system can include or be coupled to the memory so that the host system can read data from or write data to the memory. The host system can be coupled to the memory via a physical host interface. The physical host interface can provide an interface for passing control, address, data, and other signals between the memory and the host system.

Figure 2:
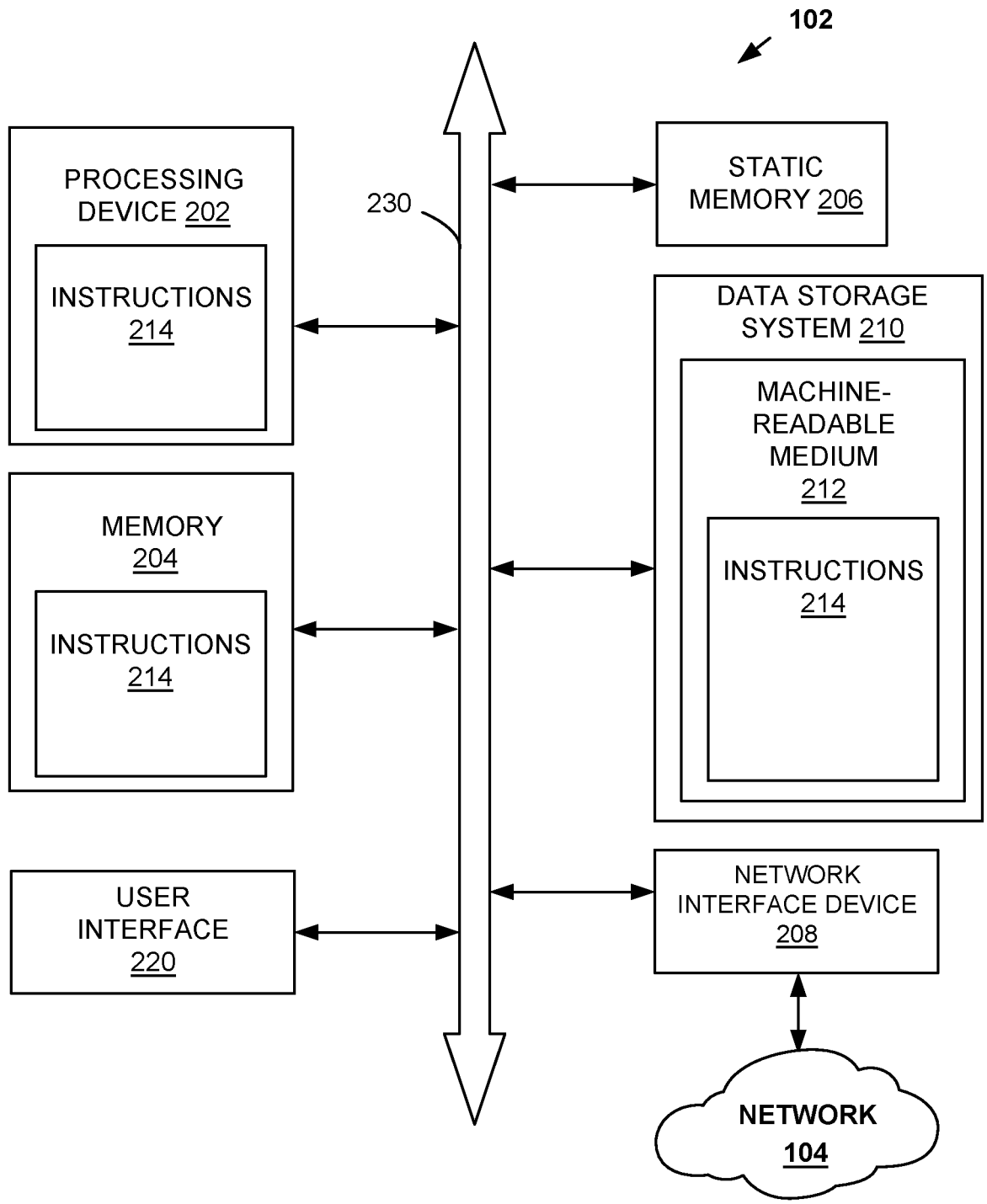
FIG. 2 illustrates a block diagram of example aspects of the external computing system shown in FIG. 1, in accordance with some embodiments of the present disclosure.

FIG. 2 shows a block diagram of example aspects of the computing system 102. FIG. 2 illustrates parts of the computing system 102 within which a set of instructions, for causing the machine to perform any one or more of the methodologies discussed herein, can be executed. In some embodiments, the computing system 102 can correspond to a host system that includes, is coupled to, or utilizes memory or can be used to perform the operations performed by any one of the computing devices, data processors, user interface devices, and sensors described herein. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment. The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computing system 102 includes a processing device 202, a main memory 204 (e.g., read-only memory (ROM), flash memory, dynamic random-access memory (DRAM), etc.), a static memory 206 (e.g., flash memory, static random-access memory (SRAM), etc.), and a data storage system 210, which communicate with each other via a bus 230.

The processing device 202 represents one or more general-purpose processing devices such as a microprocessor, a central processing unit, or the like. More particularly, the processing device can be a microprocessor or a processor implementing other instruction sets, or processors implementing a combination of instruction sets. The processing device 202 can also be one or more special-purpose processing devices such as an application specific integrated circuit (ASIC), a field programmable gate array (FPGA), a digital signal processor (DSP), network processor, or the like. The processing device 202 is configured to execute instructions 214 for performing the operations discussed herein. The computing system 102 can further include a network interface device 208 to communicate over the communication network 104 shown in FIG. 1.

The data storage system 210 can include a machine-readable storage medium 212 (also known as a computer-readable medium) on which is stored one or more sets of instructions 214 or software embodying any one or more of the methodologies or functions described herein. The instructions 214 can also reside, completely or at least partially, within the main memory 204 and/or within the processing device 202 during execution thereof by the computing system 102, the main memory 204 and the processing device 202 also constituting machine-readable storage media.

In some embodiments, the instructions 214 include instructions to implement functionality corresponding to any one of the computing devices, data processors, user interface devices, I/O devices, and sensors described herein. While the machine-readable storage medium 212 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Also, as shown, computing system 102 includes user interface 220 that can include a display and implement functionality corresponding to any one of the user interface devices disclosed herein. A user interface, such as user interface 220, or a user interface device described herein can include any space or equipment where interactions between humans and machines occur. A user interface described herein can allow operation and control of the machine from a human user, while the machine can simultaneously provide feedback information to the user. Examples of a user interface (UI), or user interface device include the interactive aspects of computer operating systems (such as graphical user interfaces), machinery operator controls, and process controls. A UI described herein can include one or more layers, including a human-machine interface (HMI) that interfaces machines with physical input hardware such as keyboards, mice, or pads, and output hardware such as monitors, speakers, and printers. Such a UI can also include a device that implements an HMI—also known as a human interface device (HID). Additional UI layers can be included in UI described herein including tactile UI (touch), visual UI (sight), auditory UI (sound), olfactory UI (smell), and gustatory UI (taste). Such a UI can also include composite user interfaces (CUIs), which are UIs that interact with two or more human senses. In some embodiments, a graphical user interface (GUI), which is composed of a tactile UI and a visual UI capable of displaying graphics, or any other type of UI can present information related to contactless bale discharge and position monitoring (such as contactless bale discharge and position monitoring using RFID technologies) to a user of the system. Sound can also be added to a GUI, such that the UI is a multimedia user interface (MUI) can provide information related to contactless bale discharge and position monitoring to the user via visual and audio means. UI described herein can also include virtual reality or augmented reality aspects.

Figure 3:
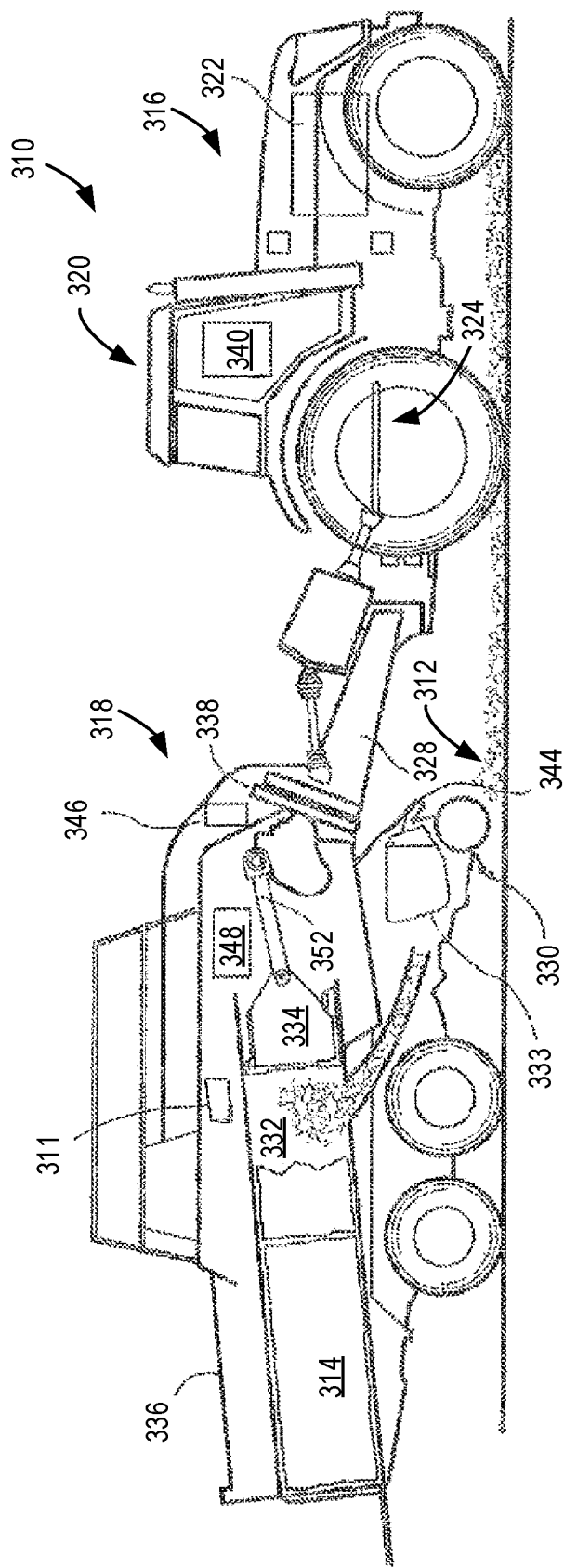
FIG. 3 illustrates a schematic side view of one of the balers shown in FIG. 1 attached to a tractor, with some portions of the baler being broken away to reveal some internal details of construction, in accordance with some embodiments of the present disclosure.

FIG. 3 illustrates a schematic side view of a baler 318 and an agricultural baler system 310 having the baler 318. Not depicted, the baler 318 can be attached to an accumulator. For example, an accumulator can be attached to the baler 318 such that it follows behind the baler 318 and bales (e.g., bale 314) can slide off the back end of the chute 336 at the rear end of the baler onto a platform of the accumulator. Also, the baler 318 is shown being attached to a towing vehicle 316 (which in the case of FIG. 3 is a tractor). As shown, some portions of the baler 318 as well as the towing vehicle 316 are broken away to reveal some internal details of construction. Also, shown in FIG. 3, is a computing system 311 of the baler 318 (which can include or be connected to an RFID reader). The computing system 311 can operate and perform methods described herein while the baler 318 bales crop material 312 from the ground into bales 314. The baler system 310 includes the towing vehicle 316 and the baler 318. The towing vehicle 316 is shown including a cab 320 in which an operator can be located and can operate the vehicle 316 as well as the baler 318. An engine 322 of the towing vehicle 316 is operable to drive movement of the vehicle; and a power take-off (PTO) 324 is operable to transfer mechanical power from the engine 322 to the baler 318. The baler 318 is hitched to the towing vehicle 316 by a fore-and-aft tongue 328, and power for operating the various mechanisms of the baler 318 can be supplied by the PTO 324 of the towing vehicle 316. One having ordinary skill in the art should appreciate in the context of the present disclosure that the baler 318 is merely illustrative, and that other types of baling devices that utilize the methods and systems described herein can be implemented.

Also, the baler 318 has a fore-and-aft extending baling chamber 332 within which bales 314 of crop material 312 are prepared. The baler 318 is depicted as an "in-line" type of baler wherein crop material 312 is picked up below and slightly ahead of baling chamber 332 and then loaded up into the bottom of chamber 332 in a straight line path of travel. A pickup assembly 330 is positioned under the tongue 328 on the longitudinal axis of the machine, somewhat forwardly of the baling chamber 332. A stuffer chute assembly 333 is generally shown, and includes a charge forming stuffer chamber that in one embodiment is curvilinear in shape. In some embodiments, the stuffer chamber can include a straight duct configuration, among other geometries. For instance, the stuffer chute assembly 333 extends generally rearward and upwardly from an inlet opening just behind the pickup assembly 330 to an outlet opening at the bottom of the baling chamber 332. In the particular illustrated embodiment, the baler 318 is an "extrusion" type baler in which the bale discharge orifice at the rear of the baler is generally smaller than upstream portions of the chamber such that the orifice restricts the freedom of movement of a previous charge and provides back pressure against which a reciprocating plunger 334 within the baling chamber 332 can act to compress charges of crop materials into the next bale. The dimensions of the discharge orifice and the squeeze pressure on the bales at the orifice are controlled by a compression mechanism as would be understood by one skilled in the art.

The plunger 334, as is known, reciprocates within the baling chamber 332 in compression and retraction strokes across the opening at the bottom of the baling chamber 332. In the portion of the plunger stroke forward of the opening, the plunger 334 uncovers the duct outlet opening, and in the rear portion of the stroke, the plunger 334 completely covers and closes off the outlet opening. The reciprocating plunger 334 presses newly introduced charges of crop material against a previously formed and tied bale 314 to thereby form a new bale. This action also causes the bales to intermittently advance toward a rear discharge opening of the baler. The completed bales 314 are tied with binding material or a similar twine. Once tied, the bales are discharged from the rear end of the baling chamber 332 onto a discharge in the form of a chute, generally designated 336.

The baler 318 (or towing vehicle 316) includes a communication bus 340 extending between the towing vehicle 316 and the baler 318. The baler has one or more crop sensors 344; one or more bale sensors 346; and can include one or more computing devices such as electronic control unit (ECU) 348. Various alternative locations for ECU 348 can be utilized, including locations on the towing vehicle 316. It will be understood that one or more ECUs 348 can be employed and that ECU 348 can be mounted at various locations on the towing vehicle 316, baler 318, or elsewhere. ECU 348 can be a hardware, software, or hardware and software computing device, and can be configured to execute various computational and control functionality with respect to baler 318 (or towing vehicle 316). As such, ECU 348 can be in electronic or other communication with various components and devices of baler 318 (or towing vehicle 316). For example, the ECU 348 can be in electronic communication with various actuators, sensors, and other devices within (or outside of) baler 318. ECU 348 can communicate with various other components (including other controllers) in various known ways, including wirelessly.

As the baled crop material 312 is formed in the baler 318, certain parameters or qualities of the crop material 312 or bale 314 can be measured or determined by the crop sensors 344 or bale sensors 346, e.g., moisture quality, baling time, bale weight, bale length, etc. In the baling chamber 332, for example, a moisture sensor can measure an electrical resistance or capacitance of the bale for detecting its moisture content. Another sensor can measure the length of the bale. Each characteristic or parameter that is measured can be done so by one or more sensors 344, 346. Each measurement can be communicated to the ECU 348 for recording. The ECU 348 can communicate the detected measurement to a data server or other database for storage. The measurements can be stored locally via the data server or wirelessly communicated via a mobile device to a remote location over the cloud-based technology.

FIG. 4 illustrates is a block diagram of example aspects of computing system 400 that can be a part of a baler, such as baler 106 shown in FIG. 1 or baler 318 shown in FIG. 3. FIG. 4 illustrates parts of the computing system 400 within which a set of instructions, for causing the machine to perform any one or more of the methodologies discussed herein, can be executed. In some embodiments, the computing system 400 can correspond to a host system that includes, is coupled to, or utilizes memory or can be used to perform the operations performed by any one of the computing devices, data processors, user interface devices, and sensors described herein. In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment. The machine can be a PC, a tablet PC, a STB, a PDA, a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computing system 400 includes a processing device 402, a main memory 404 (e.g., read-only memory, flash memory, DRAM, etc.), a static memory 406 (e.g., flash memory, SRAM, etc.), and a data storage system 410, which communicate with each other via a bus 430.

The processing device 402 represents one or more general-purpose processing devices such as a microprocessor, a central processing unit, or the like. More particularly, the processing device can be a microprocessor or a processor implementing other instruction sets, or processors implementing a combination of instruction sets. The processing device 402 can also be one or more special-purpose processing devices such as an ASIC, a FPGA, a DSP, network processor, or the like. The processing device 402 is configured to execute instructions 414 for performing the operations discussed herein. The computing system 400 can further include a network interface device 408 to communicate over the communication network 104 shown in FIG. 1.

The data storage system 410 can include a machine-readable storage medium 412 (also known as a computer-readable medium) on which is stored one or more sets of instructions 414 or software embodying any one or more of the methodologies or functions described herein. The instructions 414 can also reside, completely or at least partially, within the main memory 404 and/or within the processing device 402 during execution thereof by the computing system 400, the main memory 404 and the processing device 402 also constituting machine-readable storage media.

In some embodiments, the instructions 414 include instructions to implement functionality corresponding to any one of the computing devices, data processors, user interface devices, I/O devices, and sensors described herein. While the machine-readable storage medium 412 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Also, as shown, computing system 400 includes a sensor 420 that implements functionality corresponding to any one of the sensors disclosed herein. For example, the sensor 420 can be or include an RFID reader 422 that implements functionality corresponding to any one of the RFID readers disclosed herein. In some embodiments, the sensor 420 can include a camera or another type of optical instrument. The sensor 420 can be or include a device, a module, a machine, or a subsystem that can detect objects, events or changes in its environment and send the information to other electronics or devices, such as a computer processor or a computing system in general. The sensor 420 can include a camera configured to capturing an image or data of one or more bales. The sensor 420 can also be configured to generate RFID related information and/or image data and communicate such information and data to a computing device or an embedded processor within the sensor. In some embodiments, a processor within the sensor can perform operations performable by a computing system described herein that can perform operations of the methods described herein.

FIG. 5 illustrates side view of a binding material 552 containing a bale identification tag 562, in accordance with some embodiments of the present disclosure. In some embodiments, placement of the bale identification tag 562 onto the binding material 52 occurs during twine production. The binding material 552 can include multiple filaments or strands of non-identifying filaments 552A and at least one the identifying filament 552B incorporating the bale identification tag 562 into the individual identifying filament. The material that makes up the binding material 552 can be extruded as a sheet before being cut into individual filaments and then wound into a finished twine product. In some embodiments, during the extrusion process, the identifying filament 552B has an RFID inlay 590 inserted before the filament is wound. The RFID inlay 590 can include conducting wires of an antenna connected to a radio frequency identification (RAIN) RFID circuit or chip that can be or include an RFID tag (such as any one of the RFID tags described herein). The length of the RFID inlay 590 can be between 10 and 24 cm. As shown, the RFID inlay 590 is a segment of the identifying filament 552B with the RFID inlays 590 spaced along the identifying filament 552B at a certain interval. The identifying filament 552B incorporating the RFID inlay 590 is incorporated into the last stages of the twine production process to be wound with non-identifying filaments 552A that do not contain an RFID inlay into a twine strand, including the binding material 552, with the identifying filament 552B and the non-identifying filaments 552A.

Figure 8:
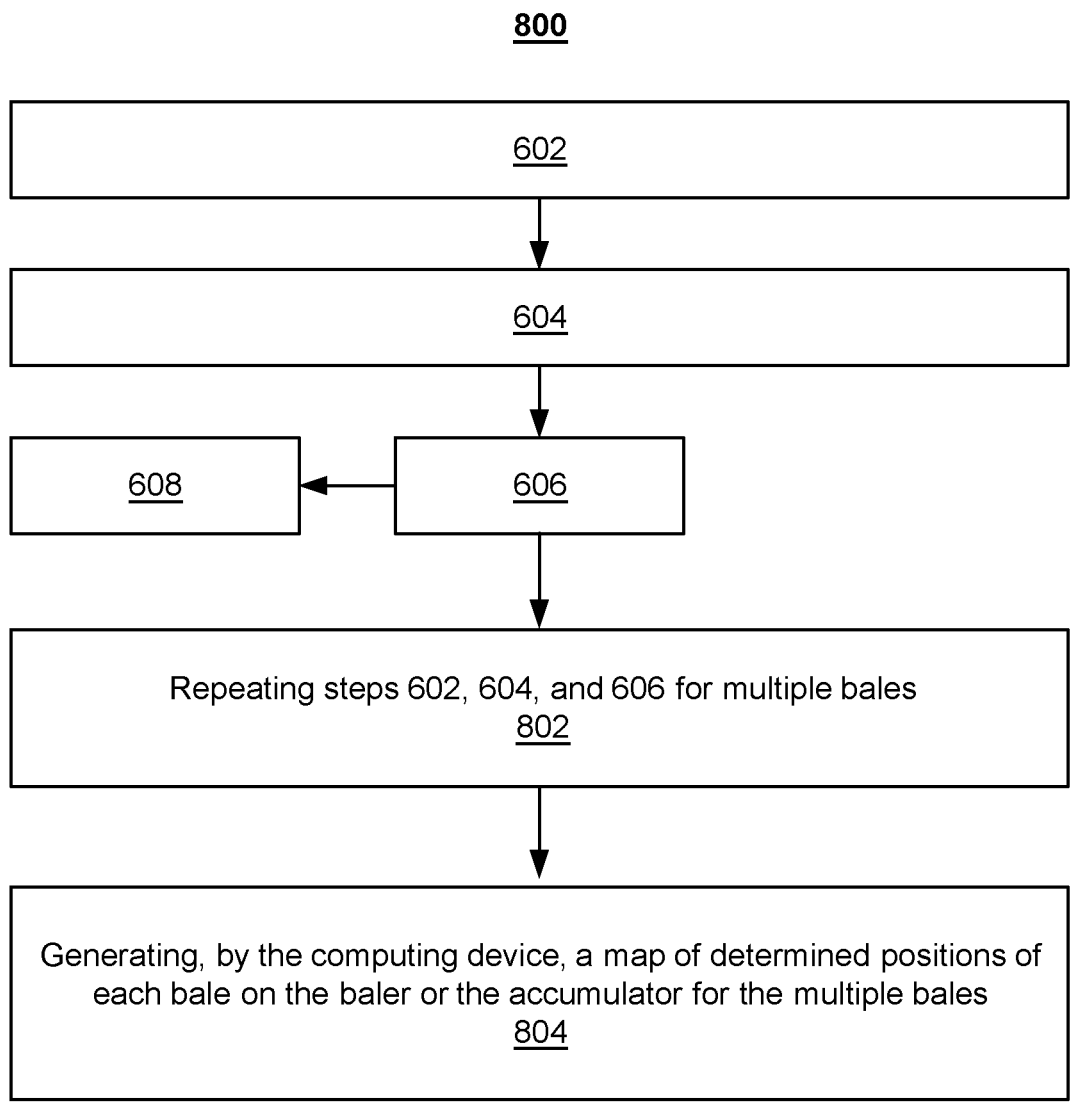
Figure 10:
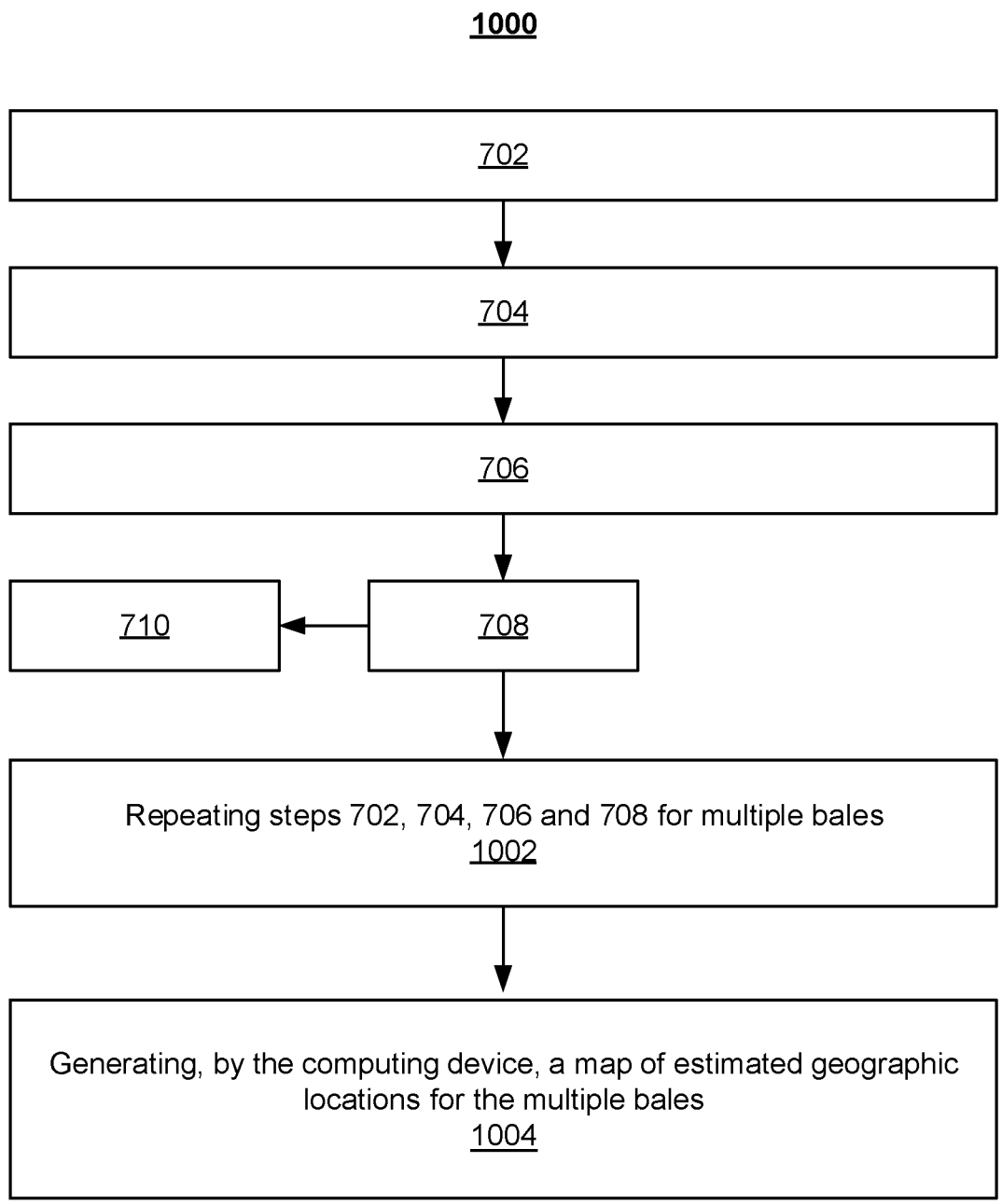

FIGS. 6, 7, 8, and 10 illustrate methods 600, 700, 800, and 1000, respectively. Specifically, FIG. 6 shows the steps of method 600, FIG. 7 shows steps of method 700, FIG. 8 shows steps of method 800, and FIG. 10 shows steps of method 1000. In some embodiments, steps 602 and 702 are performed by a RFID reader (e.g., see RFID readers 116, 117, and 118). Also, in some embodiments, the other steps of the methods 600, 700, 800, and 1000 are performed by a computing system (e.g., see computing systems 102, 126, 127, 128, and 400), such as steps 604, 606, 608, 704, 706, 708, 710, 804, and 1004. And, in some embodiments, although not depicted in FIGS. 6, 7, 8, and 10, the methods can include presenting information generated or determined in the methods via a user interface (Up-such as a UI device that includes a display (e.g., see user interface 220). Also, in some embodiments, a UI can perform user interaction operations associated with the methods. For example, a user can interact with a UI to at least partially and manually control different operations of a baler, an accumulator, or a towing vehicle towing a baler. The computing device can for the most part control the aforesaid operations, an in such embodiments, a UI can provide an interface for a user to make adjustments to the control of the operations.

Method 600 illustrates a method for controlling operations of the baler based on a determined position of the bale before discharge of the bale from an accumulator or a baler. Method 600 starts with step 602, which includes interrogating, by a RFID reader of a baler, an RFID tag of a bale (such as before a discharge of the bale from the baler or an accumulator attached to or connected to the baler). The method 600 continues with step 604, which includes identifying, by a computing device of or connected to the RFID reader, a relative location of the RFID tag with respect to the RFID reader based on the interrogation. At step 606, the method 600 continues with determining, by the computing device, a position of the bale (such as the position of the bale on the baler or an accumulator) based on the identified relative location of the RFID tag and spatial attributes of the baler and the bale. In some embodiments, the determination of the position of the bale can be based on spatial attributes of the accumulator, the baler, the bale, or any combination thereof. At step 608, the method 600 continues with controlling, by the computing device, an operation of the baler based on the determined position of the bale.

In some embodiments, the identified relative location of the RFID tag is an identified first relative location of the RFID tag, the RFID reader is a first RFID reader, and the method 600, at step 602, can include interrogating, by a second RFID reader, the RFID tag (such as before a discharge of the bale). Also, the method 600, at step 604, can include identifying, by the computing device, a second relative location of the RFID tag based on the interrogation by the second RFID reader. Furthermore, the method 600, at step 606, can include determining, by the computing device, the position of the bale (such as the position of the bale on the baler) based on the identified first relative location of the RFID tag, the identified second relative location of the RFID tag, and the spatial attributes of the baler and the bale. Thus, it is to be understood that multiple RFID readers can be used in method 600 as well as in other methods described herein.

In some embodiments, the identified relative location of the RFID tag is a first identified relative location of the RFID tag, the RFID tag is a first RFID tag of the bale, and the method 600, at step 602, can include interrogating, by the RFID reader, a second RFID tag of the bale (such as before a discharge of the bale). Also, the method 600, at step 604, can include identifying, by the computing device, a second relative location of the second RFID tag based on the interrogation of the second RFID tag. Furthermore, the method 600, at step 606, can include determining, by the computing device, the position of the bale (such as the position of the bale on the baler) based on the identified first relative location of the first RFID tag, the identified second relative location of the second RFID tag, and the spatial attributes of the baler and the bale. Thus, it is to be understood that multiple RFID tags can be used per bale in method 600 as well as in other methods described herein.

In some embodiments, the interrogation of the RFID tag, at step 602 (or any of the other interrogations by an RFID described herein), can include transmitting, by an antenna of the RFID reader, an electromagnetic interrogation pulse to the RFID tag. The interrogation of the RFID tag can also include receiving, at the antenna of the RFID reader, a response signal from the RFID tag. The response signal can be transmitted from the RFID tag in response to the electromagnetic interrogation pulse powering the RFID tag.

In some embodiments, the identifying of the relative location of the RFID tag, at step 604, (or any of the other identifications of a relative location of an RFID tag described herein), can include determining a physical attribute of the received response signal and identifying the relative location of the RFID tag based on the determined physical attribute of the received response signal. The determined physical attribute of the received response signal can include a phase angle difference of the received response signal. Also, the determined physical attribute of the received response signal can include a RSSI of the received response signal. In some embodiments, the determined physical attribute of the received response signal can include a phase angle difference of the received response signal, a RSSI of the received response signal, or any other type of attribute of the received response signal, or any combination thereof. For example, the determined physical attribute of the received response signal can include a phase angle rotation, a PDoA, a multifrequency phase difference, a MF-PDoA, a ToA, a TDoA, a AoA, a RSSI, a SNR, a Doppler shift, or any other known type of attribute of a received electromagnetic signal, or any combination thereof. The computing system can determine the physical attribute of the received response signal, such as a phase angle difference, from a corresponding transmitted signal of the received response signal and one or more backscattered signals of the received response signal. With use of PDOA to determine location or position of RFID tags, different domains of PDoA can be used including TD-PDoA, FD-PDoA, and SD-PDoA.

Method 700 illustrates a method for controlling operations of the baler based on a detection of discharging a bale from an accumulator or a baler. Method 700 starts with step 702, which includes interrogating, by a RFID reader of a baler or a RFID reader of an attached or connected accumulator, an RFID tag of a bale during discharge of the bale from the baler or an accumulator attached to or connected to the baler. In some embodiments, the interrogation, at step 702, can occur immediately after the discharge of the bale. The method 700 continues with step 704, which includes identifying, by a computing device of or connected to the RFID reader, a relative location of the RFID tag with respect to the RFID reader based on the interrogation. At step 706, the method 700 continues with identifying, by the computing device, a geographic location of the baler during the discharge of the bale or immediately after the discharge of the bale. At step 708, the method 700 continues with estimating, by the computing device, a geographic location of the discharged bale based on the identified relative location of the RFID tag and the identified geographic location of the baler. At step 710, the method 700 continues with controlling, by the computing device, an operation of the baler based on the estimated geographic location of the discharged bale.

In some embodiments, the identification of the geographic location of the baler at step 706 can be replaced with identification of the geographic location of a connected or attached accumulator or a towing vehicle towing the baler. Also, the identification of the geographic location of the baler, at step 706, can occur via a global position system (GPS) integrated with or connected to the computing device. In some embodiments, the GPS can be a part of the baler, the accumulator, the towing vehicle, or some combination thereof.

In some embodiments, the identified relative location of the RFID tag is an identified first relative location of the RFID tag, the RFID reader is a first RFID reader, and the method 700, at step 702, can include interrogating, by a second RFID reader of the baler or a second RFID of the accumulator, the RFID tag during the discharge of the bale. Also, the method 700, at step 704, can include identifying, by the computing device, a second relative location of the RFID tag based on the interrogation by the second RFID reader. Furthermore, the method 700, at step 706, can include estimating, by the computing device, the geographic location of the discharged bale based on the identified first relative location of the RFID tag, the identified second relative location of the RFID tag, and the identified geographic location of the baler, the accumulator, the towing vehicle, or a combination thereof depending on the embodiment. Thus, it is to be understood that multiple RFID readers can be used in method 700 as well as in other methods described herein.

In some embodiments, the identified relative location of the RFID tag is a first identified relative location of the RFID tag, the RFID tag is a first RFID tag of the bale, and the method 700, at step 702, can include interrogating, by the RFID reader, a second RFID tag of the bale during the discharge of the bale. Also, the method 700, at step 704, can include identifying, by the computing device, a second relative location of the second RFID tag based on the interrogation of the second RFID tag. Furthermore, the method 700, at step 706, can include estimating, by the computing device, the geographic location of the discharged bale based on the identified first relative location of the first RFID tag, the identified second relative location of the second RFID tag, and the identified geographic location of the baler, the accumulator, the towing vehicle, or a combination thereof depending on the embodiment. Thus, it is to be understood that multiple RFID tags can be used per bale in method 700 as well as in other methods described herein.

Not depicted in FIG. 7, in some embodiments, the method 700 can include discharging the bale by the baler or the accumulator, detecting the discharge of the bale via the RFID reader or a second RFID reader, and controlling, by the computing device, an operation of the baler based on the detected discharge of the bale. Also, in some embodiments, the interrogation of the RFID tag, at step 702 (or any of the other interrogations by an RFID described herein), can include transmitting, by an antenna of the RFID reader, an electromagnetic interrogation pulse to the RFID tag. The interrogation of the RFID tag can also include receiving, at the antenna of the RFID reader, a response signal from the RFID tag. The response signal can be transmitted from the RFID tag in response to the electromagnetic interrogation pulse powering the RFID tag.

In some embodiments, the identifying of the relative location of the RFID tag, at step 704, (or any of the other identifications of a relative location of an RFID tag described herein), can include determining a physical attribute of the received response signal and identifying the relative location of the RFID tag based on the determined physical attribute of the received response signal. The determined physical attribute of the received response signal can include a phase angle difference of the received response signal. Also, the determined physical attribute of the received response signal can include a RSSI of the received response signal. In some embodiments, the determined physical attribute of the received response signal can include a phase angle difference of the received response signal, a RSSI of the received response signal, or any other type of attribute of the received response signal, or any combination thereof. For example, the determined physical attribute of the received response signal can include a phase angle rotation, a PDoA, a multifrequency phase difference, a MF-PDoA, a ToA, a TDoA, a AoA, a RSSI, a SNR, a Doppler shift, or any other known type of attribute of a received electromagnetic signal, or any combination thereof. The computing system can determine the physical attribute of the received response signal, such as a phase angle difference, from a corresponding transmitted signal of the received response signal and one or more backscattered signals of the received response signal. With use of PDOA to determine location or position of RFID tags, different domains of PDoA can be used including TD-PDoA, FD-PDoA, and SD-PDoA.

Method 800 illustrates a method for generating a map of accumulated bales on a baler or on an accumulator attached to a baler but separate from the baler. As shown in FIG. 8, method 800 includes method 600. However, after step 606, the method 800, at step 802, can continue with repeating steps 602, 604, and 606 for multiple bales. At step 804, the method 800 continues with generating, by the computing device, a graphical map of determined positions of each bale on the baler or the accumulator for the multiple bales (e.g., see map 904 shown in FIG. 9).

FIG. 9 illustrates a graphical user interface 900 displaying, via a display 902, a map 904 of accumulated bales on an accumulator generated in the method 800—such as a generated map of accumulated bales on the accumulator shown in FIG. 3 or an accumulator attached to a baler but separate from the baler. As shown in FIG. 9, sectors of the map 904 (e.g., see sectors 906 and 908) are arranged according to columns and rows. Specifically, as shown, the map 904 includes sixteen sectors made up from four columns and four rows. Each column or row can represent a separate chute of an accumulator depending on the embodiment. For example, it appears in FIG. 9 that the accumulator represented by map 904 is tilted such that bales can slide into four different positions (represented by four rows) in four different chutes (represented by four columns). Sector 906 appears to hold a bale in column 1 row 3, which can represent that the bale is in a first chute of the accumulator stacked on two separate bales. Whereas sector 908 appears to be empty showing that a second chute holds two bales.

Method 1000 illustrates a method for generating a geographical map of discharged bales in a field or in multiple fields. As shown in FIG. 10, method 1000 includes method 700. However, after step 708, the method 1000, at step 1002, can continue with repeating steps 702, 704, 706 and 708 for multiple bales. At step 1004, the method 1000 continues with generating, by the computing device, a graphical map of estimated geographic locations for the multiple bales (e.g., see map 1104 shown in FIG. 11).

Figure 11:
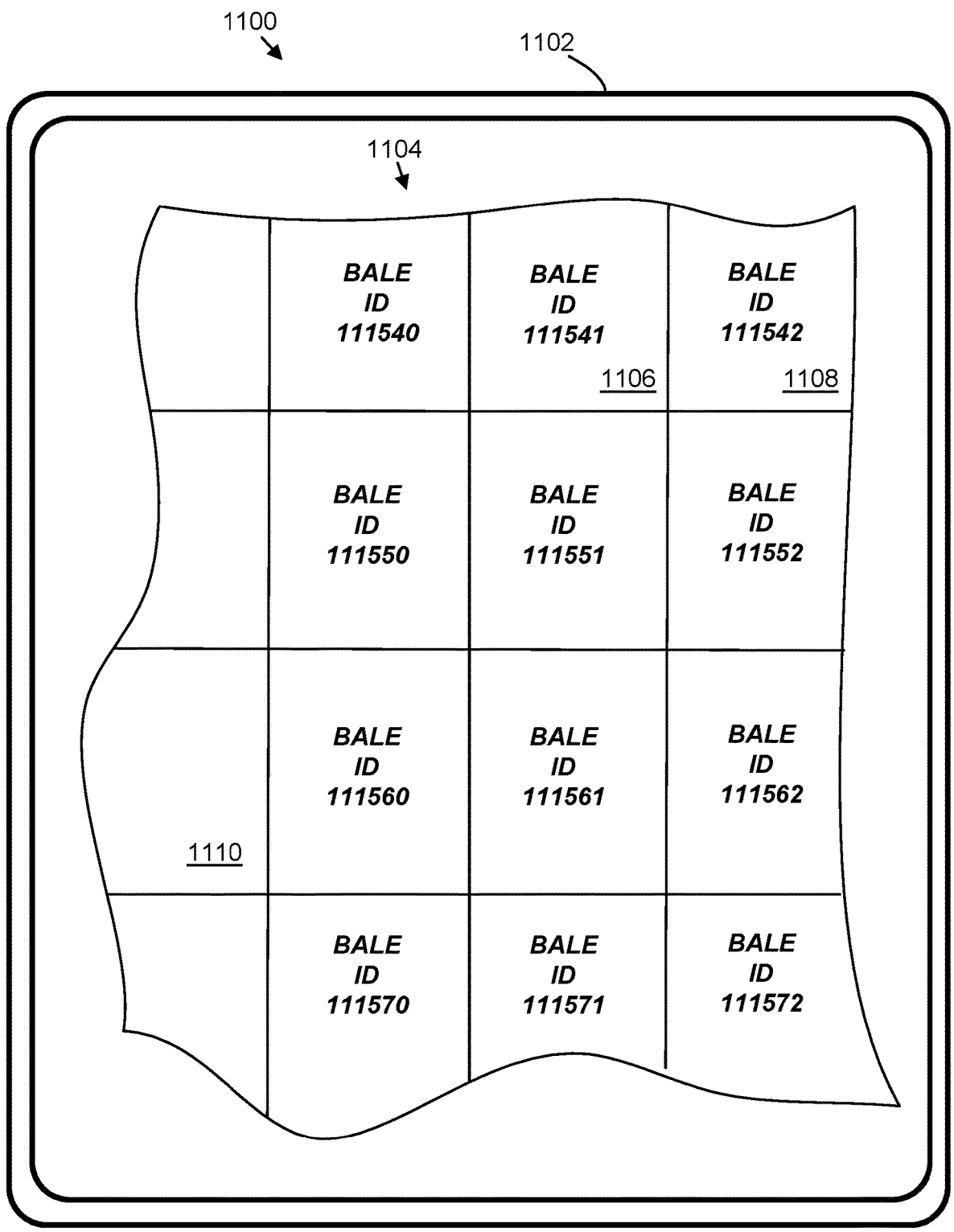
FIG. 11 illustrates an example geographical map of discharged bales, in accordance with some embodiments of the present disclosure.

FIG. 11 illustrates a graphical user interface 1100 displaying, via a display 1102, a geographical map 1104 of discharged bales. The map 1104 is generated in the method 1000. As shown in FIG. 11, sectors of the map 1104 (e.g., see sectors 1106 and 1108) include respective bale identifications associated with discharged bales. A bale identification is displayed in the map per sector. And, some sectors are shown not having a discharged bale since such sectors do not display a respective bale identification (e.g., see sector 1110). The sectors shown with bales are approximated locations of the corresponding discharged bales in a crop field or in multiple fields.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a predetermined result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that these and similar terms are to be associated with the appropriate physical quantities and are merely convenient labels applied to these quantities. The present disclosure can refer to the action and processes of a computing system, or similar electronic computing device, that manipulates and transforms data represented as physical (electronic) quantities within the computing system's registers and memories into other data similarly represented as physical quantities within the computing system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computing system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computing system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

While the invention has been described in conjunction with the specific embodiments described herein, it is evident that many alternatives, combinations, modifications and variations are apparent to those skilled in the art. Accordingly, the example embodiments of the invention, as set forth herein are intended to be illustrative only, and not in a limiting sense. Various changes can be made without departing from the spirit and scope of the invention.

What is claimed is:

1. A method, comprising:
   interrogating, by a radio-frequency identification (RFID) reader of a baler, an RFID tag of a bale;
   identifying, by a computing device of or connected to the RFID reader, a relative location of the RFID tag with respect to the RFID reader based on the interrogation; and determining, by the computing device, a position of the bale based on the identified relative location of the RFID tag.

2. The method of claim 1, comprising controlling, by the computing device, an operation of the baler based on the determined position of the bale.

3. The method of claim 1, wherein the identified relative location of the RFID tag is an identified first relative location of the RFID tag, wherein the RFID reader is a first RFID reader, and wherein the method comprises:
 interrogating, by a second RFID reader, the RFID tag;
 identifying, by the computing device, a second relative location of the RFID tag based on the interrogation by the second RFID reader; and
 determining, by the computing device, the position of the bale based on the identified first relative location of the RFID tag, the identified second relative location of the RFID tag, and spatial attributes of the baler and the bale.

4. The method of claim 1, wherein the identified relative location of the RFID tag is a first identified relative location of the RFID tag, wherein the RFID tag is a first RFID tag of the bale, and wherein the method comprises:
 interrogating, by the RFID reader, a second RFID tag of the bale;
 identifying, by the computing device, a second relative location of the second RFID tag based on the interrogation of the second RFID tag; and
 determining, by the computing device, the position of the bale based on the identified first relative location of the first RFID tag, the identified second relative location of the second RFID tag, and spatial attributes of the baler and the bale.

5. The method of claim 1, wherein the relative location of the RFID tag is a first relative location of the RFID tag, wherein the RFID reader is a first RFID reader, and wherein the method comprises:
 interrogating, by a second RFID reader of the baler, the RFID tag during discharge of the bale;
 identifying, by the computing device, a second relative location of the RFID tag based on the interrogation of the RFID tag by the second RFID reader;
 identifying, by the computing device, a geographic location of the baler during the discharge of the bale; and
 estimating, by the computing device, the geographic location of the discharged bale based on the identified second relative location of the RFID tag and the identified geographic location of the baler.

6. The method of claim 5, wherein the identification of the geographic location of the baler occurs via a global position system (GPS).

7. The method of claim 1, comprising:
 discharging the bale by the baler;
 detecting the discharge of the bale via the RFID reader or a second RFID reader; and
 controlling, by the computing device, an operation of the baler based on the detected discharge of the bale.

8. The method of claim 1, wherein the interrogation of the RFID tag comprises:
 transmitting, by an antenna of the RFID reader, an electromagnetic interrogation pulse to the RFID tag; and
 receiving, at the antenna of the RFID reader, a response signal from the RFID tag, wherein the response signal is transmitted from the RFID tag in response to the electromagnetic interrogation pulse powering the RFID tag.

9. The method of claim 8, wherein the identifying of the relative location of the RFID tag comprises:
 determining a physical attribute of the received response signal; and
 identifying the relative location of the RFID tag based on the determined physical attribute of the received response signal.

10. The method of claim 9, wherein the determined physical attribute of the received response signal comprises a phase angle difference of the received response signal.

11. The method of claim 9, wherein the determined physical attribute of the received response signal comprises a received signal strength indicator (RSSI) of the received response signal.

12. A system, comprising:
 a radio-frequency identification (RFID) reader of a baler, configured to interrogate an RFID tag of a bale before a discharge of the bale; and
 a computing device of or connected to the RFID reader, configured to:
 identify a relative location of the RFID tag with respect to the RFID reader based on the interrogation; and
 determine a position of the bale on the baler or an accumulator of or attached to the baler based on the identified relative location of the RFID tag and spatial attributes of at least one of the baler, the accumulator, the bale, or any combination thereof.

13. The system of claim 12, wherein the computing device is configured to control an operation of the baler based on the determined position of the bale.

14. The system of claim 13, wherein, in the interrogation of the RFID tag, an antenna of the RFID reader is configured to:
 transmit an electromagnetic interrogation pulse to the RFID tag; and
 receive a response signal from the RFID tag, wherein the response signal is transmitted from the RFID tag in response to the electromagnetic interrogation pulse powering the RFID tag.

15. The system of claim 14, wherein, in the identifying of the relative location of the RFID tag, the computing device is configured to:
 determine a physical attribute of the received response signal; and
 identify the relative location of the RFID tag based on the determined physical attribute of the received response signal.

16. The system of claim 15, wherein the determined physical attribute of the received response signal comprises a phase angle difference of the received response signal.

17. The system of claim 15, wherein the determined physical attribute of the received response signal comprises a received signal strength indicator (RSSI) of the received response signal.

18. The system of claim 12, wherein the relative location of the RFID tag is a first relative location of the RFID tag, wherein the system comprises the baler, which is configured to discharge the bale, wherein the RFID reader is configured to interrogate the RFID tag during the discharge of the bale, and wherein the computing device is configured to:
 identify a second relative location of the RFID tag based on the interrogation during the discharge of the bale;
 identify a geographic location of the baler during the discharge of the bale; and estimate a geographic location of the discharged bale based on the identified second relative location of the RFID tag and the identified geographic location of the baler.

19. The system of claim 18, wherein the computing device is configured to control an operation of the baler based on the estimated geographic location of the discharged bale.

20. A method, comprising the following steps:
(a) interrogating, by a radio-frequency identification (RFID) reader of a baler, an RFID tag of a bale before discharge of the bale;
(b) identifying, by a computing device of or connected to the RFID reader, a relative location of the RFID tag with respect to the RFID reader based on the interrogation;
(c) determining, by the computing device, a position of the bale on the baler based on the identified relative location of the RFID tag and spatial attributes of the baler and the bale;
(d) repeating steps (a) through (c) for multiple bales; and
(e) generating, by the computing device, a map of determined positions of each bale on the baler for the multiple bales.

* * * * *